3,316,062
METHOD OF PURIFYING TITANIUM DIBORIDE
John M. Criscione, Broadview Heights, and Lawrence M. Litz, Lakewood, Ohio, assignors to Union Carbide Corporation, a corporation of New York
No Drawing. Filed Dec. 18, 1962, Ser. No. 245,394
5 Claims. (Cl. 23—204)

This invention is directed to the purification of titanium diboride.

Titanium diboride often contains substantial amounts of an impurity characterized as a cubic phase and which is attributed to the presence of one or more compounds of titanium combined with equal atomic ratios of boron, oxygen, nitrogen, or carbon. The term "cubic phase," as used herein, including the appended claims, is intended to represent any or all of the compounds described above.

In certain applications the presence of this cubic phase is very detrimental. A problem associated with refractory bodies of titanium diboride is the danger of cracking due to high temperatures or rapid changes in temperature. It is believed that the presence of the cubic phase impurities are, at least in part, responsible for thermal cracking. Further, it has been found that these cubic phase materials are often more chemically reactive than $TiB_2$. This is particularly true, for example, in the reactivity of titanium monoboride with aluminum. Therefore, it is desirable to exclude the titanium monoboride phase from titanium diboride which is to be used in conjunction with molten aluminum. Another benefit accrued is the improvement in strength of titanium diboride bodies made from powders from which such cubic phase impurities have been removed.

It is an object of the present invention to provide titanium diboride which is substantially free of titanium monoboride titanium monoxide, titanium mononitride, and titanium monocarbide. It is another object of this invention to broaden the area of applicability of titanium diboride in the field of refractories. It is a further object of the invention to increase the flexural strength of titanium diboride compositions.

Broadly, the present invention contemplates removing the cubic phase from titanium diboride by heating the titanium diboride with a boron supplying material at an elevated temperature in an inert atmosphere. The term inert atmosphere is intended to include a vacuum which may be partial or complete.

The amount of material constituting the cubic phase, i.e., the titanium monoboride, titanium mononitride, titanium monoxide, and titanium monocarbide existing in the titanium diboride can be estimated by means of X-ray, metallographic and chemical data. Based on this analysis the titanium diboride is mixed with an amount of boron or boron supplying compound stoichiometrically sufficient to convert all the cubic phase material to titanium diboride. Illustrative are:

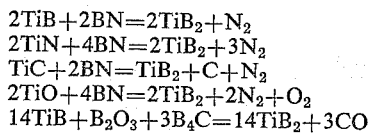

$2TiB + 2BN = 2TiB_2 + N_2$
$2TiN + 4BN = 2TiB_2 + 3N_2$
$TiC + 2BN = TiB_2 + C + N_2$
$2TiO + 4BN = 2TiB_2 + 2N_2 + O_2$
$14TiB + B_2O_3 + 3B_4C = 14TiB_2 + 3CO$

Preferably an excess of such boron supplying compound is employed. The mixture is then placed in a crucible and heated in an inert atmosphere to a temperature sufficient to purify the titanium diboride by eliminating the cubic phase. The crucible may be constructed of any suitable inert material such as graphite, boron nitride, titanium diboride or mixtures of these.

The purification can be carried out in a vacuum, e.g., an initial pressure of about 0.5 millimeter of mercury, or in an atmosphere of an inert gas. The inert gas can conveniently be passed through the furnace at a flow rate of about 5 to 10 cubic feet per hour in order to sweep out any gaseous reaction products, e.g., nitrogen and carbon monoxide, which may form. Suitable inert gases include argon, helium or hydrogen. Hydrogen is advantageous in that it may aid in removing combined oxygen from the titanium diboride.

Any compound or group of compounds or material capable of supplying boron to react with the titanium of the cubic phase to form titanium diboride is applicable to the present invention and may be referred to as a source of boron or a boron supplying material. Illustrative materials include boron nitride, boron carbide, boron oxide, elemental boron, and mixtures of these compounds. When the titanium diboride contains titanium carbide as an impurity boron oxide and boron carbide and mixtures thereof are preferred as a source of boron since they provide a means of removing the carbon as carbon monoxide. A mixture of boron oxide and carbon is also suitable for the removal of titanium monocarbide.

The purification reaction is carried out at temperatures ranging from about 1300° C. to the decomposition temperature of titanium diboride under the reaction conditions. The particular temperature depends to a large extent on the nature of the impurity to be removed and the purifying agent. For example, titanium monoboride is preferably removed by reaction with boron nitride at a temperature of at least 1500° C., titanium monoxide and titanium mononitride are preferably removed at temperatures in excess of 1800° C. Titanium monocarbide can be removed by reaction with boron nitride at a temperature of at least 1700° C. and preferably at a temperature in excess of 1900° C. If boron oxide in admixture with boron carbide or carbon is used, the titanium monocarbide can be removed at temperatures as low as 1350° C.

The term "removed" as used above is intended to indicate the removal of the named material as an impurity. This removal is accomplished by reacting the impurity with a source of boron and the consequent production of titanium diboride.

It is to be noted that the optimum purification temperature may depend in part on the nature of the boron supplying material as well as on the nature of the impurity. The examples of temperatures given above contemplate the use of boron nitride as a source of boron. Alternatively, a mixture of boron carbide and boron oxide can conveniently be employed as a source of boron, for the conversion of titanium monoboride to the diboride at a temperature as low as 1360° C.

The purification reaction is carried out for a period of time sufficient to substantially remove the impurities constituting the cubic phase, by converting the impurities to titanium diboride. The actual time is dependent on factors such as the particular impurities, the concentration of impurities, the source of boron, temperature and the degree of purity required in the product.

The following examples will serve to further illustrate the principle and the practice of the present invention.

*Example 1*

A sample of commercial titanium diboride was estimated by X-ray diffraction pattern to contain 8.0 mol. percent of titanium monoboride and 2.8 mol. percent of titanium mononitride. Based on this estimate of the titanium monoboride content 56.4 millimols of boron nitride powder was mixed with sufficient quantity of the commercial titanium diboride to supply 48.8 millimols of titanium monoboride. The titanium diboride was in the form of 325 mesh powder. The mixture was heated in an argon atmosphere for 1 hour at a temperature in the range between 1730° C. and 1840° C. After treatment, the X-ray diffraction pattern of the product showed only the presence of titanium diboride.

Chemical analysis showed that the original material contained 65.61 weight percent titanium and 29.41 weight percent titanium and 29.41 weight percent boron. After purification the material contained 68.50 weight percent titanium and 30.60 weight percent boron. This compares favorably with the theoretical 68.9 weight percent titanium and 31.1 weight percent boron in pure titanium diboride.

As a control, a sample of the original commercial titanium diboride was heated to 1950° C. for 3 hours in an argon atmosphere. The same cubic structure was present after the heat treatment as was identified in the original material.

*Example 2*

A mixture of the commercial titanium diboride and boron nitride powders as described in Example 1 was heated for 3 hours in an argon atmosphere at a temperature in the range between 1725° C. and 1825° C. The X-ray diffraction pattern of the purified product showed only titanium diboride.

Chemical analysis showed 68.5 weight percent titanium and 30.8 weight percent boron.

*Example 3*

A sample of titanium diboride powder containing an estimated 10.1 mole percent titanium mononitride and no titanium monoboride was admixed with sufficient boron nitride to react with the titanium mononitride according to the following equation:

$$2TiN + 4BN = 2TiB_2 + 3N_2$$

The admixture was heated at 1900° C. for a period of one hour in an inert atmosphere. An X-ray diffraction pattern of the purified product showed only titanium diboride. The nitrogen content of the unpurified titanium diboride was 2.12 weight percent. After purification analysis indicated the presence of 0.6 weight percent nitrogen.

*Example 4*

An admixture of titanium monoboride (138.5 millimols), boron carbide (29.8 millimols) and anhydrous boron oxide (9.86 millimols) was heated at a temperature in the range between 1360° C.–1380° C. inclusive, for 134 minutes. During this period the pressure in the reaction vessel increased from an initial pressure of less than 0.5 millimeter of mercury to about 69 millimeters. The quantity of gaseous species evolved during the reaction was 30.2 millimols. The gas was identified as carbon monoxide by infrared absorption and gas chromatographic analysis. An X-ray analysis of the solid product showed a diffraction pattern for titanium diboride alone.

What is claimed is:

1. A process for the purification of titanium diboride containing titanium monoboride as an impurity which comprises heating the impure titanium diboride with a boron supplying material selected from the group consisting of boron nitride, boron carbide, and a mixture of boron carbide and boron oxide at a temperature of at least 1300° C., in an inert atmosphere for a period of time sufficient to convert substantially all the titanium monoboride to titanium diboride.

2. A process for the purification of titanium diboride containing titanium monoboride as an impurity which comprises heating the impure titanium diboride with boron nitride in an amount at least stoichiometrically sufficient to convert all the titanium monoboride to titanium diboride, at a temperature of at least 1500° C., in an inert atmosphere, for a period of time sufficient to convert substantially all the titanium monoboride to titanium diboride.

3. A process for the purification of titanium diboride containing a cubic phase impurity which comprises heating the impure titanium diboride with sufficient boron nitride to convert substantially all the cubic phase impurity to titanium diboride, at a temperature of at least 1300° C., in an inert atmosphere, for a period of time sufficient to convert substantially all the cubic phase impurity to titanium diboride.

4. A process for the purification of titanium diboride containing a titanium monocarbide as an impurity which comprises heating the impure titanium diboride with a boron supplying material selected from the group consisting of boron oxide, boron carbide, mixtures thereof, and mixtures of boron oxide and carbon at a temperature of at least 1300° C., in an inert atmosphere for a period of time sufficient to convert substantially all the titanium monocarbide to titanium diboride, said boron supplying material being present in an amount sufficient to convert substantially all the titanium monocarbide to titanium diboride.

5. A process for the purification of titanium diboride containing titanium mononitride as an impurity which comprises heating the impure titanium diboride with sufficient boron nitride to convert substantially all the titanium mononitride to titanium diboride, at a temperature of at least 1900° C. in an inert atmosphere for a period of time sufficient to convert substantially all the titanium mononitride to titanium diboride.

References Cited by the Examiner

UNITED STATES PATENTS 3,013,862   12/1961   May _____ 23—204

OSCAR R. VERTIZ, *Primary Examiner.*

EARL C. THOMAS, *Examiner.*